Patented Aug. 5, 1952

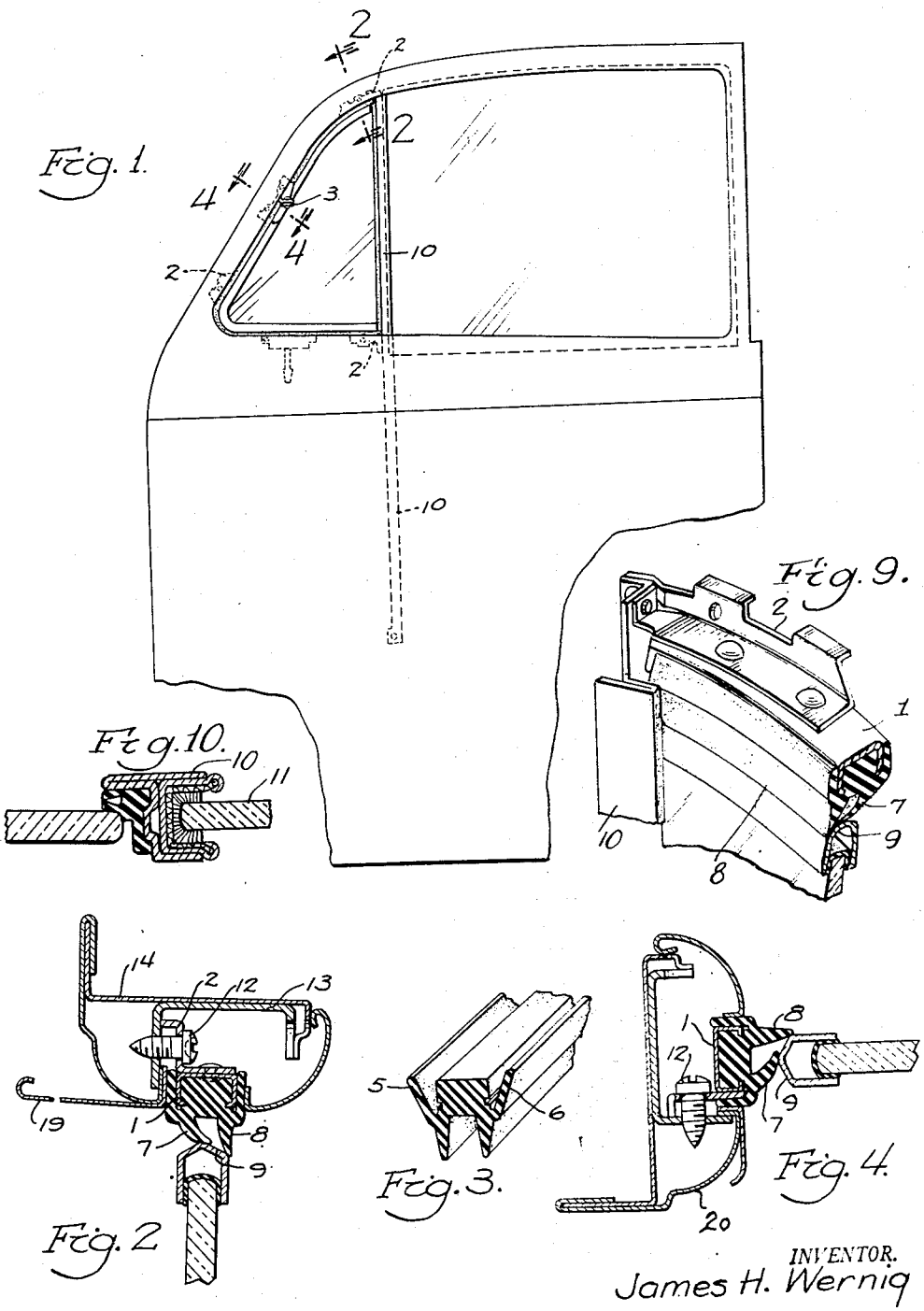

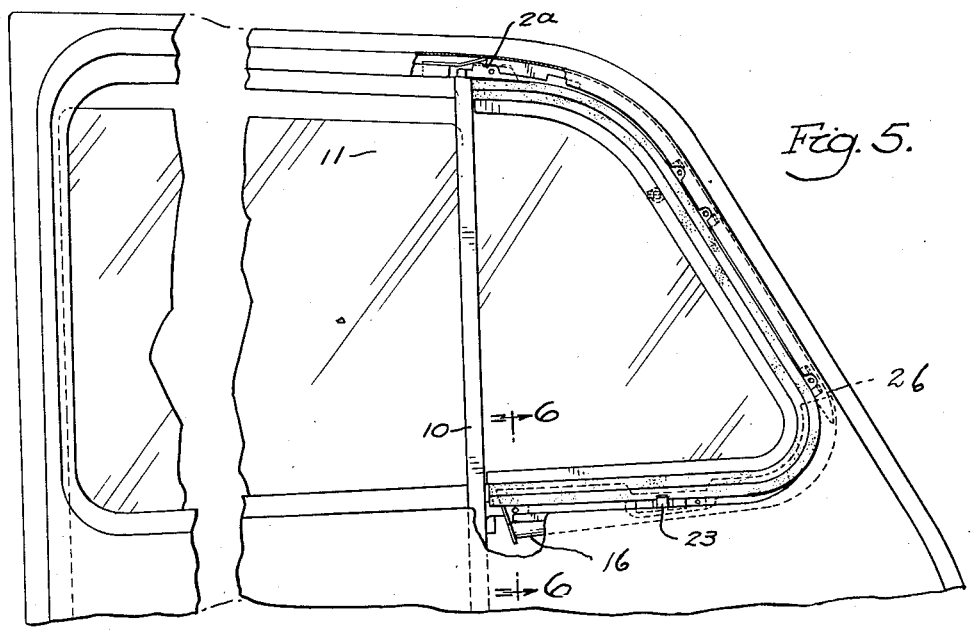
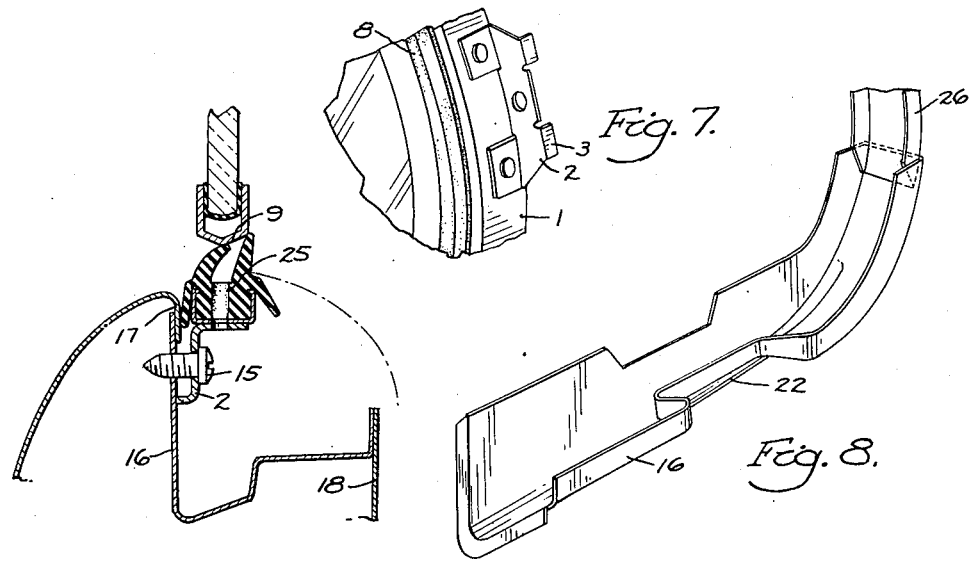

2,606,059

UNITED STATES PATENT OFFICE 2,606,059

AUTOMOBILE NO-DRAFT VENTILATING WINDOW INSTALLATION

James H. Wernig, Bloomfield Village, Mich., assignor to General Motors Corporation, Detroit, Mich., a corporation of Delaware Application August 5, 1950, Serial No. 177,855

4 Claims. (Cl. 296—44)

This invention relates to the Fisher no draft ventilation (Fisher 2,043,605) and a new weatherstrip for better sealing the window opening frame for the swinging window.

With the Fisher no draft ventilation it has been customary to have a weatherstrip such as shown in the Fisher patent with the flanges seated on the face of the reveal and the garnish molding. The weatherstrip is mounted in a channel which is secured by screws to the door jamb. There has been no proper coordination between the division pillar with its window stop weatherstrip and the weatherstrip stop for the front edge of the glass panel.

The division pillar carries at the rear the guide for the sliding window. In prior installations the division pillar was fitted over the front edge of the vertically sliding glass so that it was not too loose nor too binding. The division pillar was installed independently of the channel frame which carried the swinging ventilator panel. Then the channel which carries the weatherstrip was fixed in the window opening by anchoring screws put through the door jamb. If the channel were drawn up tight the flanges might properly seat upon the outside face of the reveal and garnish molding but the rear edge of the swinging glass panel might not seat properly on the weatherstrip on the division pillar to get a weathertight seal. Or if the screws were not drawn tight to get the proper location of the edge of the glass with respect to the division pillar weatherstrip window stop, the flanges of the front weatherstrip would not be properly seated upon the reveal and the garnish molding and the window had undesirable and annoying leaks.

It is the object of the present invention to obviate these troubles by providing a unit installation of the window frame and the division pillar. The division pillar is properly fitted over the raised sliding glass and then the frame is secured in the door window opening wherever the fitting of the window guide over the edge of the sliding glass causes the window frame to be. The frame can, when so spotted, be held by hand but preferably by a jig, and then the frame is fastened in this spotted position by means of power driven self-penetrating and self-tapping screws.

A unique flange weatherstrip permits this spotting of the frame in correct location dictated by fitting the window guide over the sliding glass edge, and at the same time a nearly perfect window seal is obtained.

Referring to the drawings:

Fig. 1 is an elevation of an automobile body door with my improved no draft ventilator installation.

Fig. 2 is a section on the line 2—2 of Fig. 1.

Fig. 3 is a detail in sectional perspective of the improved weatherstrip.

Fig. 4 is a section on the line 4—4 of Fig. 1.

Fig. 5 is an inside elevation of the upper portion of the door with the garnish molding and trimming removed to show the no draft window installation.

Fig. 6 is a section on the line 6—6 of Fig. 5.

Fig. 7 is a detail of one of the brackets by which the window frame unit is secured to the door frame.

Fig. 8 is a perspective of the drain trough used in the window well.

Fig. 9 is a detail view of the bracket at the top of the division pillar.

Fig. 10 is a cross section through the division pillar and the adjoining glass panels.

The no draft ventilator frame or weatherstrip retaining channel is designated 1. This, in the old construction, had clips welded on the back. Tapped holes were made so the clips could be drawn to the door jamb by screws inserted from the outside of the jamb. With my improvement I rivet to the weatherstrip retaining channel 1 four Z brackets 2. The bracket 3 at the pivot is an L section bracket fastened to the side wall of the channel instead of the bottom wall as are the four Z brackets.

The weatherstrip (Fig. 3) has flanges or wings 5 and 6. It also has two fins 7 and 8 which act as sealing fins.

The swinging glass panel has a frame of generally U cross section with the bottom of the U of a double bevel or chamfer shape as at 9. This facilitates rolling over the sealing fin 7.

The division pillar is designated 10 (Fig. 3). This is secured to the channel 1 by the riveted angle brackets 2 so the division pillar and channel frame 1 form a unit installation. The window guide portion of the division pillar which extends down into the window well, can be properly fitted over the vertically sliding glass. Then the whole installation is held by hand, but preferably by a suitable jig, and the screws 12 are inserted in the brackets and driven by a power tool into self-penetrating and self-tapping relation to the reinforcing channel 13 on the inside of the door jamb 14. Screw 15 (Fig. 6) is driven into the drain trough 16 which is spot welded to the turned in reveal flange 17 and the inner panel 18 of the door. This trough carries any water that may get into the window well over the lock and window regulator to protect these instruments and the trim material. It has a notch 22 to clear the window regulator shaft 23.

The flanges 5 and 6 of the weatherstrip allow the spotting and placing of the installation at the location determined by fitting the window guide over the glass edge without in any way impairing the seal. The screws 12 and 15 jamb the flange 5 against the turned in reveal flange 17 and the upper drain trough 19. Then the garnish molding 20 is driven up tightly against the flange 6 by the usual garnish molding screws that are not shown in any of the views.

The flanges, as shown in Fig. 3, are made to tend to stand away from the body of the weatherstrip so that they will be more or less effective as a seat although not clamped tightly by the garnish molding or jammed against the turned in flange of the reveal.

The drain trough shown well in Fig. 8 and in dotted lines in Fig. 5 joins the reinforcing channel 13 at the latter's lower end 26. Any water thrown or drained into either is carried over the instruments and drained out the open end of the trough into the bottom of the window well. Holes 25 are made in the weatherstrip to allow the water to drain out of the weatherstrip into these troughs.

The brackets 2 need not be separate members. The channel 1 could be wider or have a flange so that it could be secured directly to the channel 13 in the correctly spotted position.

What I claim is:

1. In an automobile body having a door jamb with a reinforcing angle section strip secured to the back thereof, a no draft ventilating assembly having in combination a front weatherstrip retaining channel frame, a weatherstrip contained therein, a division pillar fastened to said channel frame having on one side a weatherstrip to act as a window stop and the other side a guide for a vertically sliding window, a swinging window pivoted in said channel frame and sealed by the first mentioned weatherstrip, and perforated angle brackets fastened to the channel and which can be fastened to the outside wall of the reinforcing strip by means of self-tapping screws after the window guide of the division pillar has been properly fitted over the side edge of the vertically sliding window and the channel window frame has been spotted thereby on the outside wall of the angle section reinforcing strip.

2. A ventilating window installation for automobile bodies, having in combination a window frame having at the front and bottom section an inwardly directed channel, a weatherstrip with two flanges seated over the side walls of said channel, one flange being squeezed between the outside channel wall and the turned over reveal flange of the body when the frame is fastened in place, and the other flange squeezed between the inner channel wall and the garnish molding when the garnish molding is secured in place on the inside of the window frame, a swinging glass panel pivoted in said channel frame, a division pillar and window guide containing a weatherstrip acting as a window stop and containing a guide for the vertically sliding window fastened to the channel frame to make a single unit for installation in the window opening and well, and perforated brackets attached to the channel frame which can be located and spotted on part of the body structure at selected points depending upon the fitting of the window guide portion of the division pillar over the glass edge of the vertically sliding window and screws put through openings in the bracket so spotted as to correctly fasten the assembly in the window opening.

3. In an automobile body having a door jamb with a reinforcing angle section strip secured to the back thereof, a no draft ventilating assembly having in combination a front weatherstrip retaining channel frame, a weatherstrip contained therein, said weatherstrip having a pair of flanges that droop over the side walls of the retaining channel and one may be pinched between the outside wall of the channel and the reveal flange of the door and the other flange may be pinched between the inside wall of the retaining channel and the garnish molding when this is secured in place, a division pillar fastened to said channel frame having on one side a weatherstrip to act as a window stop and the other side a guide for a vertically sliding window, a swinging window pivoted in said channel frame and sealed by the first mentioned weatherstrip, and perforated angle brackets fastened to the channel and which can be fastened to the outside wall of the reinforcing strip by means of self-tapping screws after the window guide of the division pillar has been properly fitted over the side edge of the vertically sliding window and the channel window frame has been spotted thereby on the outside wall of the angle section reinforcing strip.

4. In an automobile body having a door jamb with a reinforcing angle section strip secured to the back thereof, a no draft ventilating assembly having in combination a front weatherstrip retaining channel frame, a weatherstrip contained therein, the weatherstrip having a pair of flanges that by reason of their set project out over the side walls of the retaining channel and one may be pinched between the outside wall of the channel and the reveal flange of the door and the other flange may be pinched between the inside wall of the retaining channel and the garnish molding when this is secured in place, a division pillar fastened to said channel frame having on one side a weatherstrip to act as a window stop and the other side a guide for a vertically sliding window, a swinging window pivoted in said channel frame and sealed by the first mentioned weatherstrip, and perforated angle brackets fastened to the channel and which can be fastened to the outside wall of the reinforcing strip by means of self-tapping screws after the window guide of the division pillar has been properly fitted over the side edge of the vertically sliding window and the channel window frame has been spotted thereby on the outside wall of the angle section reinforcing strip.

JAMES H. WERNIG.

REFERENCES CITED

The following references are of record in the file of this patent:

UNITED STATES PATENTS

| Number | Name | Date |
| --- | --- | --- |
| 2,109,249 | Hickman | Feb. 22, 1938 |
| 2,110,121 | Ball | Mar. 8, 1938 |
| 2,253,818 | Simpson | Aug. 26, 1941 |
| 2,262,644 | Mackey | Nov. 11, 1941 |
| 2,390,260 | King | Dec. 4, 1945 |